(12) United States Patent
Xiao et al.

(10) Patent No.: US 12,061,386 B2
(45) Date of Patent: Aug. 13, 2024

(54) DIMMING GLASS, DIMMING MODULE AND OPERATING METHOD THEREOF

(71) Applicants: Beijing BOE Sensor Technology Co., Ltd., Beijing (CN); BOE Technology Group Co., Ltd., Beijing (CN)

(72) Inventors: Yuelei Xiao, Beijing (CN); Yue Li, Beijing (CN); Fengchun Pang, Beijing (CN); Xue Cao, Beijing (CN); Na Li, Beijing (CN); Juan Chen, Beijing (CN); Sikai Zhang, Beijing (CN); Yifan Wu, Beijing (CN); Wenbo Chang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/626,472

(22) PCT Filed: Mar. 10, 2021

(86) PCT No.: PCT/CN2021/079857
§ 371 (c)(1),
(2) Date: Jan. 11, 2022

(87) PCT Pub. No.: WO2021/197000
PCT Pub. Date: Oct. 7, 2021

(65) Prior Publication Data
US 2023/0014763 A1 Jan. 19, 2023

(30) Foreign Application Priority Data
Apr. 2, 2020 (CN) .......................... 202010255236.5

(51) Int. Cl.
*G02F 1/1333* (2006.01)
*G02F 1/1337* (2006.01)
*G02F 1/1343* (2006.01)

(52) U.S. Cl.
CPC ...... *G02F 1/133382* (2013.01); *G02F 1/1337* (2013.01); *G02F 1/1343* (2013.01)

(58) Field of Classification Search
None
See application file for complete search history.

(56) References Cited

U.S. PATENT DOCUMENTS

2014/0055696 A1* 2/2014 Lee .................. G02F 1/133305
349/20
2018/0284521 A1* 10/2018 Kong ................. G02F 1/13473
(Continued)

FOREIGN PATENT DOCUMENTS

CN 204143127 U 2/2015
CN 205581462 U 9/2016
(Continued)

OTHER PUBLICATIONS

Machine translation of CN205581462 (Year: 2016).*
(Continued)

*Primary Examiner* — Phu Vu
(74) *Attorney, Agent, or Firm* — IPro, PLLC

(57) ABSTRACT

The present disclosure provides dimming glass, a dimming module and an operating method thereof. The dimming glass includes: a first glass substrate and a second glass substrate arranged opposite to each other; a first electrode and a second electrode arranged between the first glass substrate and the second glass substrate; a liquid crystal dimming layer arranged between the first glass substrate and the second glass substrate; and a heating layer arranged between the liquid crystal dimming layer and the first glass substrate, (Continued)

and configured to heat the liquid crystal dimming layer upon the receipt of an electric signal.

10 Claims, 4 Drawing Sheets

(56) References Cited

U.S. PATENT DOCUMENTS

2019/0353940 A1\* 11/2019 Zhao ................ G02F 1/136286
2022/0413334 A1\* 12/2022 Garner ................ G02F 1/1676

FOREIGN PATENT DOCUMENTS

| CN | 106842664 A | 6/2017 |
| CN | 106990586 A | 7/2017 |
| CN | 206725890 U | 12/2017 |
| CN | 206773333 U | 12/2017 |
| CN | 109143654 A | 1/2019 |
| CN | 109709704 A | 5/2019 |
| CN | 111308763 A | 6/2020 |

OTHER PUBLICATIONS

CN 202010255236.5 first office action.
PCT/CN2021/079857 international search report and written opinion.

\* cited by examiner

DIMMING GLASS, DIMMING MODULE AND OPERATING METHOD THEREOF

CROSS-REFERENCE TO RELATED APPLICATION

This application is the U.S. national phase of PCT application No. PCT/CN2021/079857 filed on Mar. 10, 2021, which claims a priority of the Chinese patent application No.202010255236.5 filed on Apr. 2, 2020, which is incorporated herein by reference in its entirety.

TECHNICAL FIELD

The present disclosure relates to the field of dimming glass technology, in particularly to dimming glass, a dimming module and an operating method thereof.

BACKGROUND

Dimming glass includes Polymer Dispersed Liquid Crystal (PDLC) dimming glass, Electrochromic (EC) dimming glass and dye liquid crystal dimming glass. The PDLC dimming glass is used to merely switch between a transparent state and a hazing state without a light-shading effect. In addition, due to large viscosity, a polymer dispersed liquid crystal fluid is not suitable for a liquid crystal dropping process. The EC dimming glass has such problems as slow response and high requirement on thickness evenness of an electrode film layer. The dye liquid crystal dimming glass has such problems as large viscosity and slow response in a low-temperature environment.

SUMMARY

An object of the present disclosure is to provide dimming glass, a dimming module and an operating method thereof, so as to shorten a response time of the dimming glass in the low-temperature environment.

The present disclosure provides the following technical solutions.

In one aspect, the present disclosure provides in some embodiments dimming glass, including a first glass substrate and a second glass substrate arranged opposite to each other; a first electrode and a second electrode arranged between the first glass substrate and the second glass substrate; a liquid crystal dimming layer arranged between the first glass substrate and the second glass substrate; and a heating layer arranged between the liquid crystal dimming layer and the first glass substrate and configured to heat the liquid crystal dimming layer upon the receipt of an electric signal.

In a possible embodiment of the present disclosure, the first electrode is arranged at a side of the first glass substrate facing the second glass substrate, and the second electrode is arranged at a side of the second glass substrate facing the first glass substrate.

In a possible embodiment of the present disclosure, the dimming glass further includes a first alignment film layer arranged at a side of the first electrode facing the second electrode, and a second alignment film layer arranged at a side of the second electrode facing the first electrode. The liquid crystal dimming layer is arranged between the first alignment film layer and the second alignment film layer.

In a possible embodiment of the present disclosure, the heating layer is arranged between the first electrode and the first glass substrate, and an insulation layer is arranged between the first electrode and the heating layer.

In a possible embodiment of the present disclosure, the heating layer includes: a plurality of metal wires arranged in a first direction and a plurality of metal wires arranged in a second direction, the first direction crossing the second direction; or a plurality of metal wires arranged in the first direction.

In a possible embodiment of the present disclosure, a line width of the metal wire is less than or equal to 4 µm.

In a possible embodiment of the present disclosure, in the plurality of metal wires arranged in the first direction, a distance between two adjacent metal wires is greater than or equal to 0.5 mm; or in the plurality of metal wires arranged in the second direction, a distance between two adjacent metal wires is greater than or equal to 0.5 mm.

In a possible embodiment of the present disclosure, the liquid crystal dimming layer includes liquid crystal molecules arranged directionally, and dichroic dyes evenly distributed among the liquid crystal molecules.

In a possible embodiment of the present disclosure, the first electrode and the second electrode are planar transparent electrodes.

In another aspect, the present disclosure provides in some embodiments a dimming module, including the above-mentioned dimming glass and a temperature sensor arranged outside the dimming glass.

In yet another aspect, the present disclosure provides in some embodiments an operating method for the above-mentioned dimming module, including: detecting a temperature of the dimming glass with a temperature sensor; and when the temperature of the dimming glass is less than or equal to a first threshold, inputting a direct current (DC) signal to the heating layer; and when the temperature of the dimming glass is greater than or equal to a second threshold, stopping inputting the DC signal to the heating layer. The second threshold is greater than or equal to the first threshold.

In a possible embodiment of the present disclosure, the operating method further includes adjusting electric signals applied to the first electrode and/or the second electrode in accordance with a desired light transmittance of the dimming glass.

Figure 1:
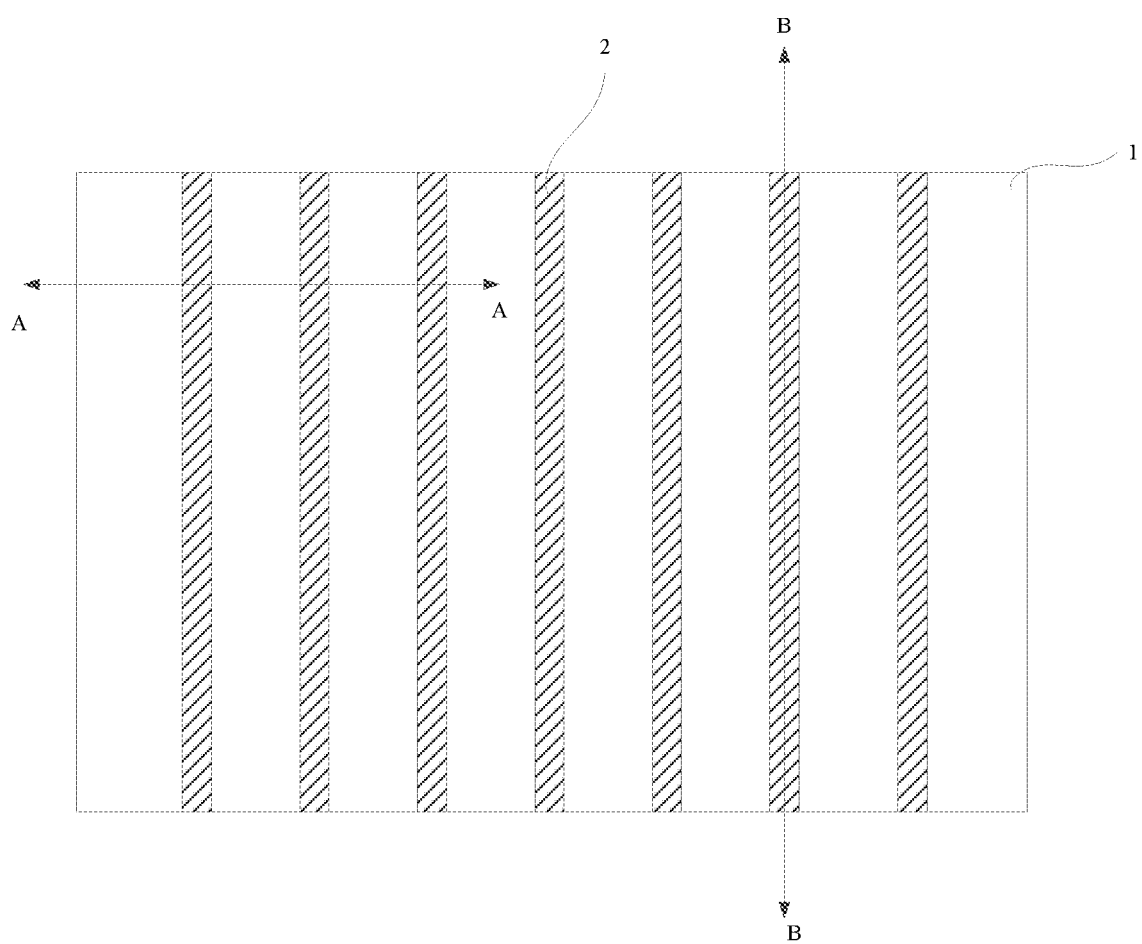
FIG. 1 is a schematic view showing the formation a metal wire on a first glass substrate according to one embodiment of the present disclosure.

REFERENCE SIGN LIST 1 first glass substrate
2 metal wire
3 insulation layer
4 first electrode
5 first alignment film layer
6 second alignment film layer
7 second electrode
8 second glass substrate
9 sealant 10 spacer
11 liquid crystal molecule
12 dichroic dye

DETAILED DESCRIPTION

In order to make the objects, the technical solutions and the advantages of the present disclosure more apparent, the present disclosure will be described hereinafter in a clear and complete manner in conjunction with the drawings and embodiments.

Dye liquid crystal dimming glass includes a guest-host dye liquid crystal, and has such advantages as rapid response and low dark state transmittance. In addition, it is able to provide colorful dimming glass through changing a composition of the dye. However, in actual use, the dye liquid crystal has such problems as large viscosity and slow response in a low-temperature environment, leading to an increase in the dark state transmittance of the dye liquid crystal dimming glass at low temperature, so it is impossible to meet user's requirements. Taking vertical alignment (VA)-type guest-host dye liquid crystal dimming glass as an example, the dark state transmittance of the dye liquid crystal dimming glass at a normal temperature is less than 1% through applying a driving voltage of 20V. When an ambient temperature decreases to −30° C., under the same driving voltage, the dark state transmittance of the dye liquid crystal dimming glass increases to about 10%, and a light-shading effect decreases significantly.

An object of the present disclosure is to provide dimming glass, a dimming module and an operating method thereof, so as to solve the problem in the related art where the dimming glass has a high dark state transmittance and a long response time in a low-temperature environment.

The present disclosure provides in some embodiments dimming glass, which includes: a first glass substrate and a second glass substrate arranged opposite to each other; a first electrode and a second electrode arranged between the first glass substrate and the second glass substrate; a liquid crystal dimming layer arranged between the first glass substrate and the second glass substrate; and a heating layer arranged between the liquid crystal dimming layer and the first glass substrate, and configured to heat the liquid crystal dimming layer upon the receipt of an electric signal.

According to the embodiments of the present disclosure, the heating layer is integrated in the dimming glass, and it generates heat upon the receipt of the electric signal. When the dimming glass operates in a low-temperature environment, it is able to heat the dimming glass through inputting the electric signal to the heating layer. As a result, it is able to solve the problem in the related art where the dimming glass has a low transmittance and a long response time in the low-temperature environment, and enable the dimming glass to be available in the low-temperature environment, thereby to significantly broaden application scenarios of the dimming glass.

In the embodiments of the present disclosure, the first electrode and the second electrode may be arranged on a same glass substrate or on different glass substrates. In order to effectively drive a liquid crystal in the liquid crystal dimming layer to be deflected, the first electrode and the second electrode are arranged on different glass substrates so as to effectively drive the liquid crystals adjacent to another glass substrate to be deflected under the effect of an electric field when the first electrode and the second electrode are arranged on a same glass substrate.

As shown in FIG. 1, the heating layer includes a plurality of metal wires 2 formed on the first glass substrate 1, arranged in a first direction and parallel to each other. Alternatively, the heating layer includes a plurality of metal wires arranged in the first direction and a plurality of metal wires arranged in a second direction, and the first direction crosses the second direction, that is, the metal wires are arranged in a grid shape. Of course, the arrangement of the metal wires is not limited thereto, as long as the metal wires are evenly arranged on the first glass substrate to evenly heat the liquid crystal dimming layer.

Figure 2:
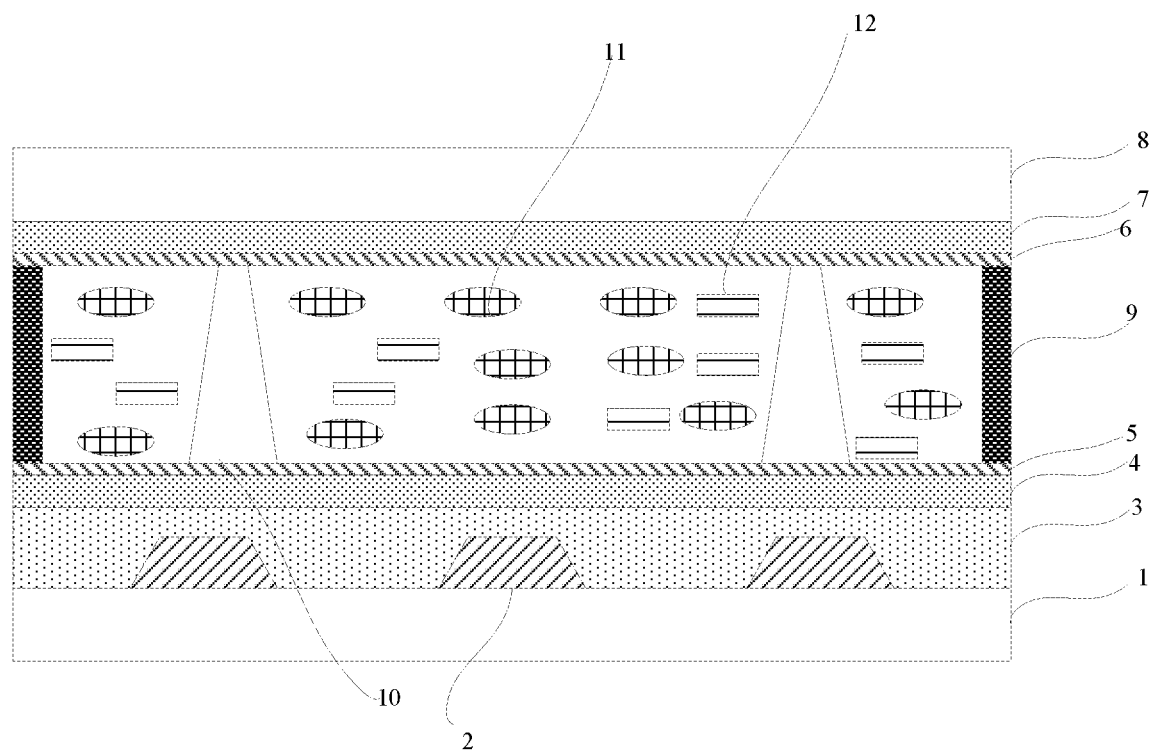
FIG. 2 to FIG. 4 are sectional views of dimming glass according to one embodiment of the present disclosure.
Figure 3:
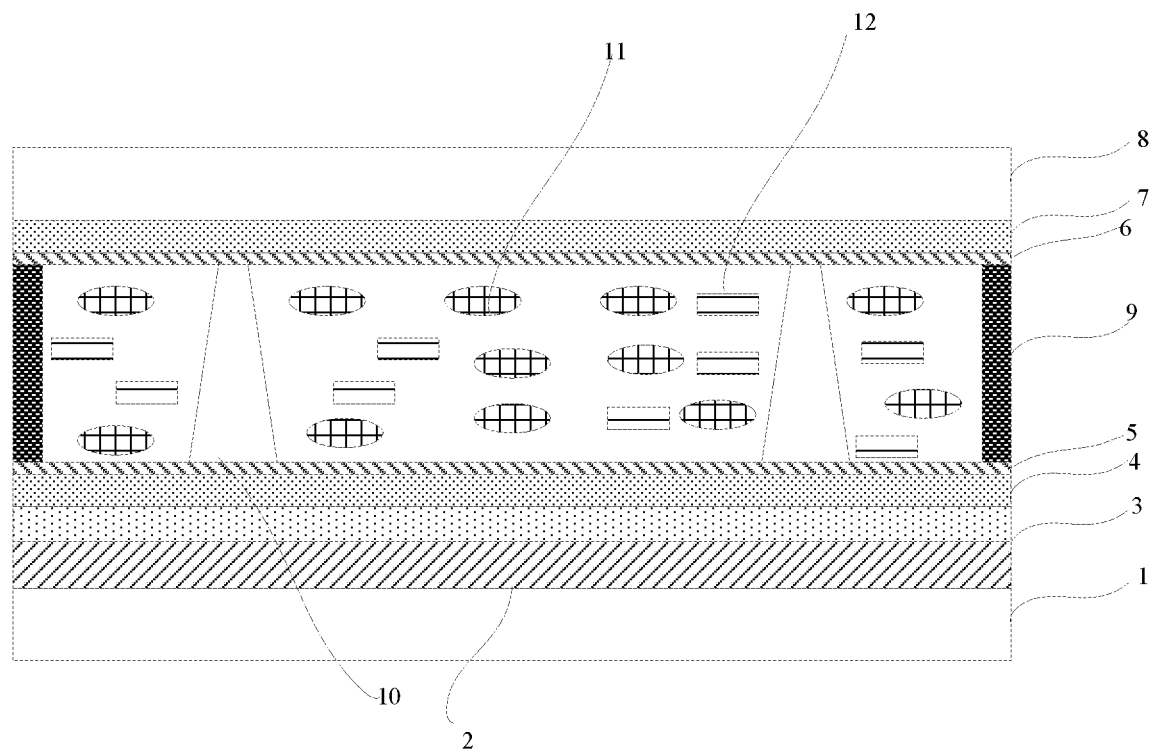
Figure 4:
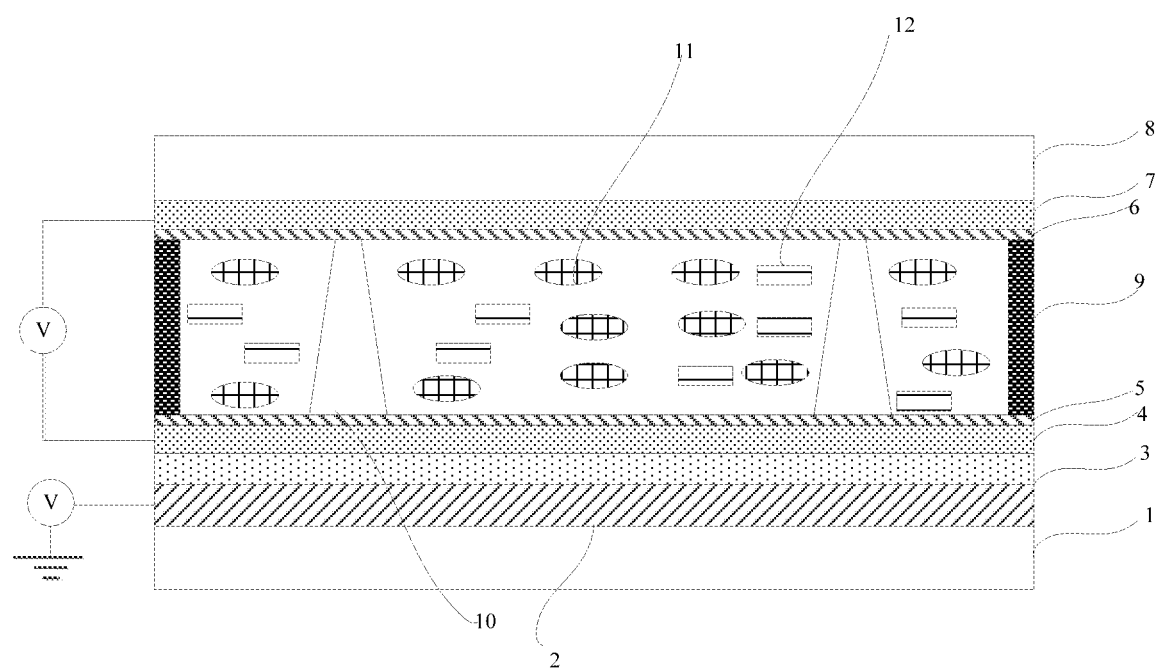

FIG. 2 is a sectional view of the dimming glass along line AA in FIG. 1, and FIG. 3 and FIG. 4 are sectional views of the dimming glass along line BB in FIG. 1.

As shown in FIG. 2 to FIG. 4, the dimming glass includes a first glass substrate 1 and a second glass substrate 8 arranged opposite to each other, a metal wire 2 arranged at a side of the first glass substrate 1 facing the second glass substrate 8, an insulation layer 3 arranged at a side of the metal wire 2 facing the second glass substrate 8, a first electrode 4 arranged at a side of the insulation layer 3 facing the second glass substrate 8, a first alignment film layer 5 arranged at a side of the first electrode 4 facing the second glass substrate 8, a second electrode 7 arranged at a side of the second glass substrate 8 facing the first glass substrate 1, a second alignment film layer 6 arranged at a side of the second electrode 7 facing the first glass substrate 1, and a liquid crystal dimming layer arranged between the second alignment film layer 6 and the first alignment film layer 5.

The metal wire 2 is used to achieve a heating function. To be specific, the metal wire 2 generates heat upon the receipt of a DC signal, so as to heat the liquid crystal dimming layer. The metal wire 2 may be made of a metal with excellent conductivity, such as silver (Ag) or copper (Cu). In order to prevent the metal wire 2 from adversely affecting a light transmittance of the dimming glass, a line width of the metal wire 2 does not exceed 4 μm. Experiments show that, when the line width of the metal wire 2 does not exceed 4 μm, it is impossible to identify the metal wire 2 when a distance between human eyes and the dimming glass is more than 20 cm. In order to further prevent the metal wire 2 from adversely affecting the light transmittance of the dimming glass, when the metal wire 2 is arranged as a grid and the heating layer includes the plurality of metal wires arranged in the first direction and the plurality of metal wires arranged in the second direction, a distance between two adjacent metal wires in the plurality of metal wires arranged in the first direction is greater than or equal to 0.5 mm; or when the heating layer includes the plurality of metal wires arranged in the first direction, a distance between two adjacent metal wires is greater than or equal to 0.5 mm.

In addition, in order to ensure the conductivity of the metal wire 2, a thickness of the metal wire 2 is not less than 1 μm.

In order to insulate the metal wire 2 from the first electrode 4, the insulation layer 3 is arranged between the metal wire 2 and the first electrode 4. The insulation layer 3 may be made of an organic insulation material with a relatively large thickness, so as to provide a flat surface for the formation of the first electrode 4 and prevent an electric signal on the first electrode 4 from being adversely affected by an electric signal on the metal wire 2. Of course, the insulation layer 3 may also be made of an inorganic insulation material such as silicon nitride, silicon oxynitride, or silicon oxide.

In order to maintain a cell gap between the first glass substrate 1 and the second glass substrate 8, a spacer 10 is arranged between the first glass substrate 1 and the second glass substrate 8. In addition, the first glass substrate 1 and the second glass substrate 8 are packaged together through a sealant 9.

In order to prevent the first electrode 4 and the second electrode 7 from adversely affecting the light transmittance of the dimming glass, both the first electrode 4 and the second electrode 7 may be made of a transparent conductive material, such as Indium Tin Oxide (ITO). In order to increase an intensity of the electric field, both the first electrode 4 and the second electrode 7 may be planar electrodes. Of course, the first electrode 4 and the second electrode 7 are not limited to planar electrodes, and they may also be strip-like electrodes.

When it is necessary to achieve the dimming function of the dimming glass, as shown in FIG. 4, the first electrode 4 is grounded, and an alternating current (AC) signal of 0V-20V is applied to the second electrode 8. A size of the electric signal applied to the second electrode 8 is adjusted in accordance with a desired light transmittance of the dimming glass.

In order to heat the liquid crystal dimming layer through the heating layer, as shown in FIG. 4, a DC signal may be applied to both ends of the metal wire 2, and the DC signal flows through the metal wire 2 to generate heat to heat the liquid crystal dimming layer. When the temperature of the dimming glass is less than or equal to the first threshold, such as 0° C., the heating function is started and the DC signal is applied to both ends of the metal wire 2. When the metal wire 2 is made of Ag, resistivity of Ag is $1.58 \times 10^{-8} \Omega/m$, and resistance of the wire is 3.9 kΩ per meter. Based on an equation $P=U^2/R$, when the DC signal is 24V, heating power of the Ag wire per unit length is about 0.14 W. 2000 wires may be provided in an area of 1 $m^2$, so the heating power per unit area may reach 250 $W/m^2$. When the temperature of the dimming glass is greater than or equal to the second threshold, such as 25° C., the application of the DC signal to both ends of the metal wire 2 is stopped.

The dye liquid crystal dimming glass made of a guest-host dye liquid crystal has such advantages as a short response time and a low dark state transmittance. In addition, colorful dimming glass is obtained through changing a composition of the dye. In this regard, in the embodiments of the present disclosure, the dimming glass may be the dye liquid crystal dimming glass. As shown in FIG. 2 to FIG. 4, the liquid crystal dimming layer includes liquid crystal molecules 11 arranged directionally, and dichroic dyes 12 evenly distributed among the liquid crystal molecules 11. The electric signal is applied to the first electrode 4 and the second electrode 7 so as to obtain the liquid crystal molecules 11 and the dichroic dyes 12 to be deflected, thereby to control the light transmittance of the dimming glass. In addition, the colorful dimming glass is obtained through changing the composition of the dichroic dye 12.

The liquid crystal molecule 11 in the liquid crystal dimming layer may be a positive liquid crystal or a negative liquid crystal. The dichroic dyes 12 have different absorptivity for polarized light vertical and parallel to a molecular axis. To be specific, the dichroic dyes 12 absorb the polarized light in one direction and allow the polarized light vertical to that direction to pass therethrough.

Figure 5:
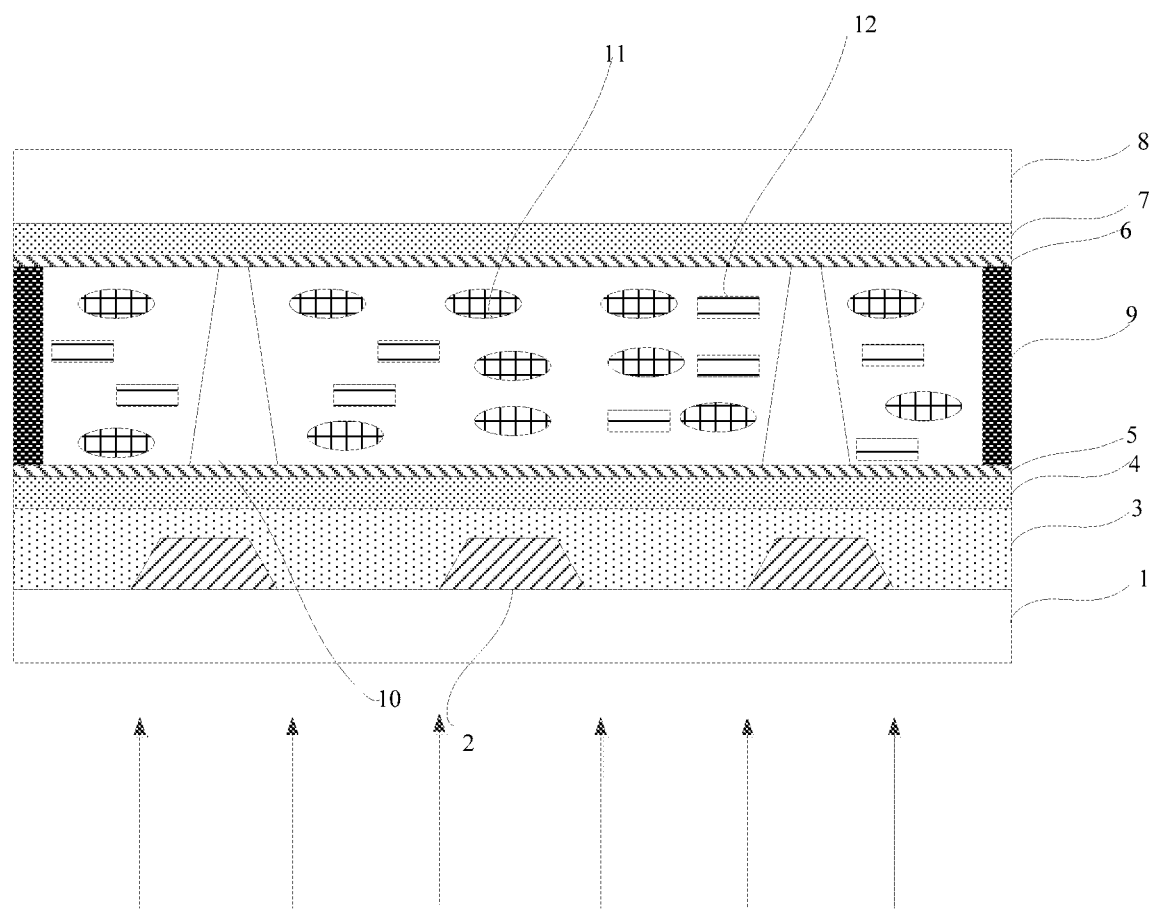
FIG. 5 is a schematic view showing a situation where no light is allowed to pass through the dimming glass according to one embodiment of the present disclosure.
Figure 6:
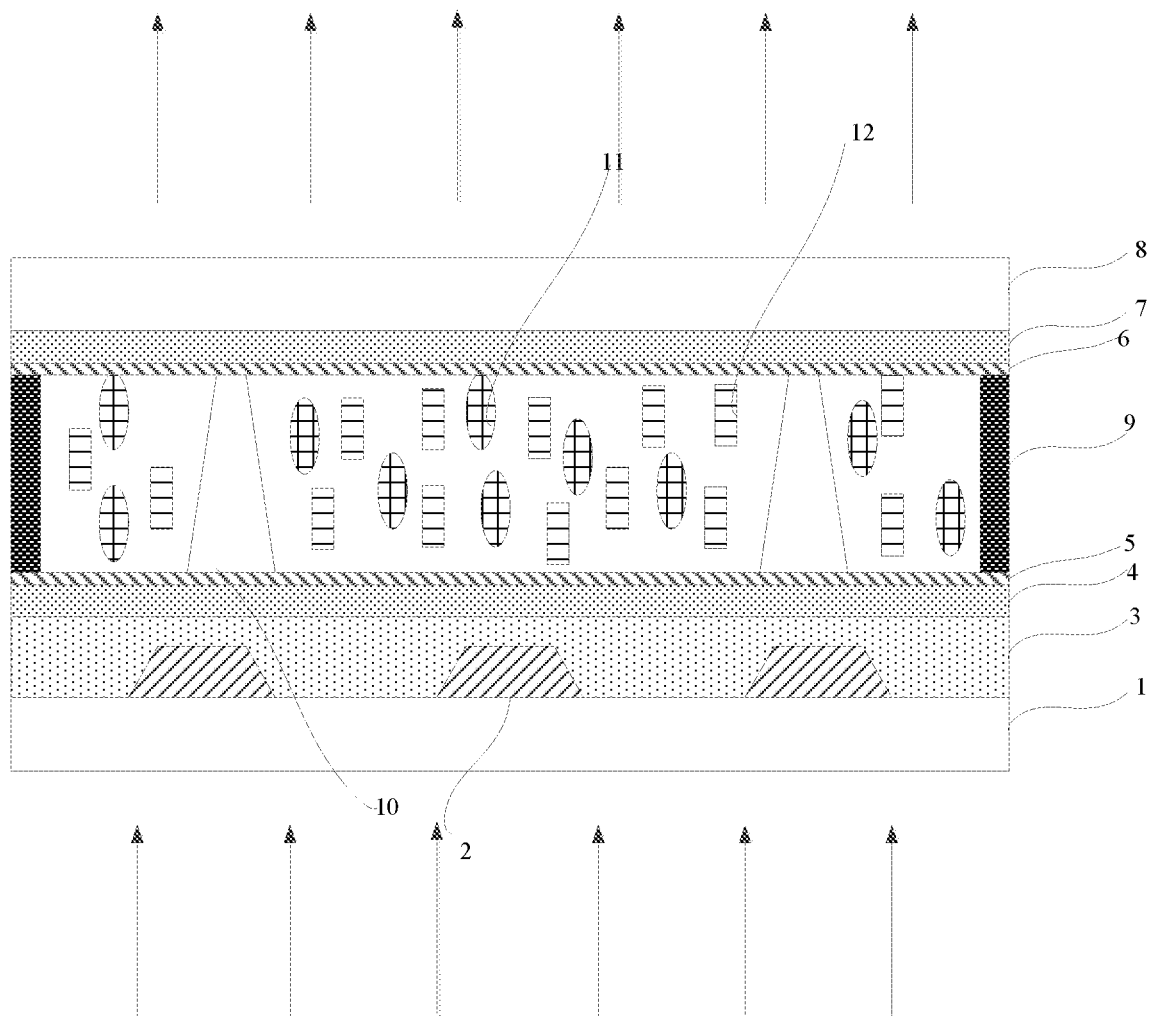
FIG. 6 is a schematic view showing a situation where light is allowed to pass through the dimming glass according to one embodiment of the present disclosure.

When the liquid crystal molecule 11 is the positive liquid crystal and an electric field is not applied to the liquid crystal dimming layer, as shown in FIG. 5, the liquid crystal molecules 11 and the dichroic dyes 12 are parallel to the first glass substrate 1, the polarized light is parallel to a direction in which light is absorbed by the dichroic dyes 12, and the light reaching the dimming glass is absorbed, so the light is not allowed to pass through the dimming glass, and the dimming glass is in a dark state. When an electric field is applied to the liquid crystal dimming layer, as shown in FIG. 6, the liquid crystal molecules 11 and the dichroic dyes 12 are vertical to the first glass substrate 1, and the polarized light is vertical to the direction in which light is absorbed by the dichroic dyes 12, so the polarized light is allowed to pass through the dimming glass, and the dimming glass is in a bright state. FIG. 5 and FIG. 6 are sectional views of the dimming glass along line AA in FIG. 1.

When the liquid crystal molecule 11 is the negative liquid crystal and an electric field is applied to the liquid crystal dimming layer, as shown in FIG. 5, the liquid crystal molecules 11 and the dichroic dyes 12 are parallel to the first glass substrate 1, the polarized light is parallel to a direction in which light is absorbed by the dichroic dyes 12, and the light reaching the dimming glass is absorbed, so the light is not allowed to pass through the dimming glass and the dimming glass is in a dark state. When an electric field is not applied to the liquid crystal dimming layer, as shown in FIG. 6, the liquid crystal molecules 11 and the dichroic dyes 12 are vertical to the first glass substrate 1, and the polarized light is vertical to a direction in which the light is absorbed by the dichroic dyes 12, so the light is allowed to pass through the dimming glass, and the dimming glass is in a bright state.

According to the embodiments of the present disclosure, the dimming glass has such advantages as adjusting the light transmittance and heating the glass, so it is able to prevent the dye liquid crystal dimming glass from being adversely affected at a low temperature, and prevent the dark state transmittance of the dye liquid crystal dimming glass in a low-temperature environment from being too high through applying the electric signal to the metal wire to heat the liquid crystal dimming layer, thereby to broaden application scenarios of the dye liquid crystal dimming glass. In addition, the heating function and the dimming function are integrated in one liquid crystal cell, thereby to simplify a structure of the dimming glass. Moreover, the metal wire 2 is independent of the first electrode 4, so the heating function and the dimming function of the dimming glass may be achieved independently.

Of course, in some embodiments of the present disclosure, the first electrode 4 may serve as the metal wire 2, so as to simplify the structure of the dimming glass. However, at this time, the heating function and the dimming function of the dimming glass may not be achieved at the same time.

The present disclosure further provides in some embodiments a dimming module, which includes the above-mentioned dimming glass, and a temperature sensor arranged outside the dimming glass.

The temperature sensor is used to detect a temperature of the dimming glass. When the temperature of the dimming glass is less than or equal to a first threshold, a DC signal is input to the heating layer, so as to heat the dimming glass. When the temperature of the dimming glass is greater than or equal to a second threshold, the application of the DC signal to the heating layer is stopped. The second threshold is greater than or equal to the first threshold.

The present disclosure further provides in some embodiments an operating method for the above-mentioned dimming module, which includes: detecting a temperature of the dimming glass with the temperature sensor; when the temperature of the dimming glass is less than or equal to a first threshold, inputting a DC signal to the heating layer; and when the temperature of the dimming glass is greater than or equal to a second threshold, stopping inputting the DC signal to the heating layer. The second threshold is greater than or equal to the first threshold.

In a possible embodiment of the present disclosure, When the temperature of the dimming glass is less than or equal to the first threshold, such as 0° C., the heating function is started and the DC signal is applied to both ends of the metal wire 2. When the metal wire 2 is made of Ag, resistivity of Ag is $1.58 \times 10^{-8} \Omega/m$, and resistance of the wire is 3.9 kΩ per meter. Based on an equation $P=U^2/R$, when the DC signal is 24V, heating power of the Ag wire per unit length is about 0.14 W. 2000 wires may be provided in an area of 1 m², so the heating power per unit area may reach 250 W/m². When the temperature of the dimming glass is greater than or equal to the second threshold, such as 25° C., the application of the DC signal to both ends of the metal wire 2 is stopped.

Of course, a value of the first threshold is not limited to 0° C., and a value of the second threshold is not limited to 25° C. The first threshold and the second threshold may be any other values according to the practical need.

In the embodiments of the present disclosure, the operating method further includes adjusting electric signals applied to the first electrode and/or the second electrode in accordance with a desired light transmittance of the dimming glass.

When it is necessary to achieve the dimming function of the dimming glass, as shown in FIG. 4, the first electrode 4 is grounded, and an AC signal of 0V-20V is applied to the second electrode 8. A size of the electric signal applied to the second electrode 8 is adjusted in accordance with the desired light transmittance of the dimming glass.

As shown in FIG. 2 to FIG. 4, the liquid crystal dimming layer of the dimming glass includes liquid crystal molecules 11 arranged directionally, and dichroic dyes 12 evenly distributed among the liquid crystal molecules 11. The liquid crystal molecule 11 in the liquid crystal dimming layer may be a positive liquid crystal or a negative liquid crystal. The dichroic dyes 12 have different absorptivity for polarized light vertical and parallel to a molecular axis. To be specific, the dichroic dyes 12 absorb the polarized light in one direction and allow the polarized light vertical to that direction to pass therethrough.

When the liquid crystal molecule 11 is the positive liquid crystal and an electric field is not applied to the liquid crystal dimming layer, as shown in FIG. 5, the liquid crystal molecules 11 and the dichroic dyes 12 are parallel to the first glass substrate 1, the polarized light is parallel to a direction in which light is absorbed by the dichroic dyes 12, and the light reaching the dimming glass is absorbed, so the light is not allowed to pass through the dimming glass, and the dimming glass is in a dark state. When an electric field is applied to the liquid crystal dimming layer, as shown in FIG. 6, the liquid crystal molecules 11 and the dichroic dyes 12 are vertical to the first glass substrate 1, and the polarized light is vertical to the direction in which light is absorbed by the dichroic dyes 12, so the polarized light is allowed to pass through the dimming glass, and the dimming glass is in a bright state. FIG. 5 and FIG. 6 are sectional views of the dimming glass along line AA in FIG. 1.

When the liquid crystal molecule 11 is the negative liquid crystal and an electric field is applied to the liquid crystal dimming layer, as shown in FIG. 5, the liquid crystal molecules 11 and the dichroic dyes 12 are parallel to the first glass substrate 1, the polarized light is parallel to a direction in which light is absorbed by the dichroic dyes 12, and the light reaching the dimming glass is absorbed, so the light is not allowed to pass through the dimming glass and the dimming glass is in a dark state. When an electric field is not applied to the liquid crystal dimming layer, as shown in FIG. 6, the liquid crystal molecules 11 and the dichroic dyes 12 are vertical to the first glass substrate 1, and the polarized light is vertical to a direction in which the light is absorbed by the dichroic dyes 12, so the light is allowed to pass through the dimming glass, and the dimming glass is in a bright state.

In the embodiments of the present disclosure, it is able to control a deflection angle of the liquid crystal molecules 11 and the dichroic dyes 12 through controlling an intensity of the electric field, so as to control an intensity of the light passing through the dimming glass, thereby to provide different light transmittances.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. Dimming glass, comprising:
    a first glass substrate and a second glass substrate arranged opposite to each other;
    a first electrode and a second electrode arranged between the first glass substrate and the second glass substrate;
    a liquid crystal dimming layer arranged between the first glass substrate and the second glass substrate; and
    a heating layer arranged between the liquid crystal dimming layer and the first glass substrate, and configured to heat the liquid crystal dimming layer upon the receipt of an electric signal;

wherein the heating layer further comprises: a plurality of metal wires arranged in a first direction and a plurality of metal wires arranged in a second direction, the first direction crossing the second direction; or a plurality of metal wires arranged in the first direction;

wherein a line width of the metal wire is less than or equal to 4 μm; a thickness of the metal wire is not less than 1 μm;

wherein in the plurality of metal wires arranged in the first direction, a distance between two adjacent metal wires is greater than or equal to 0.5 mm; or in the plurality of metal wires arranged in the second direction, a distance between two adjacent metal wires is greater than or equal to 0.5 mm; and wherein the liquid crystal dimming layer comprises liquid crystal molecules arranged directionally, and dichroic dyes evenly distributed among the liquid crystal molecules.

2. The dimming glass according to claim 1, wherein the first electrode is arranged at a side of the first glass substrate facing the second glass substrate, and the second electrode is arranged at a side of the second glass substrate facing the first glass substrate.

3. The dimming glass according to claim 2, further comprising a first alignment film layer arranged at a side of the first electrode facing the second electrode, and a second alignment film layer arranged at a side of the second electrode facing the first electrode;

wherein the liquid crystal dimming layer is arranged between the first alignment film layer and the second alignment film layer.

4. The dimming glass according to claim 2, wherein the heating layer is arranged between the first electrode and the first glass substrate, and an insulation layer is arranged between the first electrode and the heating layer.

5. The dimming glass according to claim 1, wherein the first electrode and the second electrode are planar transparent electrodes.

6. A dimming module, comprising the dimming glass according to claim 1 and a temperature sensor arranged outside the dimming glass.

7. An operating method for the dimming module according to claim 6, comprising:

detecting a temperature of the dimming glass with the temperature sensor;

when the temperature of the dimming glass is less than or equal to a first threshold, inputting a direct current (DC) signal to the heating layer; and when the temperature of the dimming glass is greater than or equal to a second threshold, stopping inputting the DC signal to the heating layer, wherein the second threshold is greater than or equal to the first threshold.

8. The operating method according to claim 7, further comprising adjusting electric signals applied to the first electrode and/or the second electrode in accordance with a light transmittance of the dimming glass.

9. The dimming glass according to claim 2, wherein the first electrode and the second electrode are planar transparent electrodes.

10. The dimming glass according to claim 3, wherein the first electrode and the second electrode are planar transparent electrodes.

* * * * *